(12) United States Patent
Kubota et al.

(10) Patent No.: US 9,705,294 B2
(45) Date of Patent: Jul. 11, 2017

(54) ENCLOSED SWITCHBOARD

(71) Applicant: Mitsubishi Electric Corporation, Chiyoda-ku, Tokyo (JP)

(72) Inventors: Kazuyoshi Kubota, Tokyo (JP); Makoto Miyanishi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/044,449

(22) Filed: Feb. 16, 2016

(65) Prior Publication Data
US 2016/0164266 A1    Jun. 9, 2016

Related U.S. Application Data

(62) Division of application No. 14/126,724, filed as application No. PCT/JP2012/063860 on May 30, 2012, now Pat. No. 9,608,413.

(30) Foreign Application Priority Data

Jul. 29, 2011 (JP) ................................ 2011-166375
Aug. 2, 2011 (JP) ................................ 2011-168998
Sep. 9, 2011 (JP) ................................ 2011-196815

(51) Int. Cl.
*H02B 1/54* (2006.01)
*H02B 1/20* (2006.01)
(Continued)

(52) U.S. Cl.
CPC ................ *H02B 1/54* (2013.01); *H02B 1/06* (2013.01); *H02B 1/202* (2013.01); *H02B 1/303* (2013.01);
(Continued)

(58) Field of Classification Search
CPC . H05K 5/00; H02B 1/01; H02B 1/202; H02B 1/54; H02B 1/56; H02B 1/18;
(Continued)

(56) References Cited

U.S. PATENT DOCUMENTS 1,955,287 A * 4/1934 Graves, Jr. ............. H02B 1/202
                                                        361/609
3,278,807 A * 10/1966 Galante .................. H02B 1/056
                                                        200/293
(Continued)

FOREIGN PATENT DOCUMENTS

JP          55-145808 U       11/1980
JP          56-66107 A        6/1981
(Continued)

OTHER PUBLICATIONS

Gulfport, Fillers, Apr. 26, 2005, Gulfport, pp. 30-32.*
(Continued)

*Primary Examiner* — Zachary M Pape
*Assistant Examiner* — Amir Jalali
(74) *Attorney, Agent, or Firm* — Buchanan Ingersoll & Rooney PC

(57) ABSTRACT

An enclosed switchboard includes: a device containing board which contains main circuit devices such as circuit breakers; and a cable connection board which is arranged side by side adjacently to the device containing board, and contains cables that input and output electric power to/from the main circuit devices. In the enclosed switchboard, the cable connection board is configured by one housing; and the inside of the housing is divided into two by a partition plate to be comparted to a cable lead-in compartment which contains lead-in side cables and a cable lead-out compartment which contains lead-out side cables.

8 Claims, 9 Drawing Sheets

(51) Int. Cl.
*H02B 1/56* (2006.01)
*H02B 1/46* (2006.01)
*H02B 1/06* (2006.01)
*H02B 1/30* (2006.01)
*H02B 11/12* (2006.01)

(52) U.S. Cl.
CPC ............... *H02B 1/46* (2013.01); *H02B 1/56* (2013.01); *H02B 1/301* (2013.01); *H02B 11/12* (2013.01)

(58) Field of Classification Search
CPC ......... H02B 11/00; H02B 11/12; H02B 11/28; H02B 13/00; H02B 13/005
USPC ........ 361/601, 605, 611, 615–616, 622, 624, 361/626–628, 631–632, 634, 637, 639, 361/641, 643–644, 648, 652, 647, 800, 361/810, 816, 819, 826, 828–829, 832, 361/837; 174/68.1–68.2, 149, 387, 390; 340/635; 218/44, 74–76, 152
See application file for complete search history.

(56) References Cited

U.S. PATENT DOCUMENTS

| | | | | |
|---|---|---|---|---|
| 3,673,426 | A * | 6/1972 | Weston | H01H 21/58 200/1 V |
| 3,967,165 | A * | 6/1976 | Olashaw | H02B 1/202 174/16.1 |
| 4,146,915 | A | 3/1979 | Yosida | |
| 4,361,369 | A * | 11/1982 | Zwillich | B62D 27/023 211/182 |
| 4,504,885 | A | 3/1985 | Yoshikawa et al. | |
| 4,866,569 | A * | 9/1989 | Okumura | H02B 7/01 307/147 |
| 4,958,256 | A | 9/1990 | Parkhomenko et al. | |
| 5,062,022 | A * | 10/1991 | Beard | H02B 7/00 361/605 |
| 5,231,687 | A | 7/1993 | Handley | |
| 5,245,506 | A | 9/1993 | Tanimizu | |
| 5,574,624 | A | 11/1996 | Rennie et al. | |
| 5,660,719 | A | 8/1997 | Kurtz et al. | |
| 5,683,001 | A * | 11/1997 | Masuda | H05K 7/183 211/189 |
| 5,689,097 | A * | 11/1997 | Aufermann | H02B 13/025 218/157 |
| 5,721,396 | A | 2/1998 | Daoud | |
| 5,985,481 | A | 11/1999 | Champagne et al. | |
| 6,069,787 | A * | 5/2000 | Wilkie, II | H02B 1/303 312/223.1 |
| 6,175,486 | B1 * | 1/2001 | Ponsioen | H02B 7/01 218/152 |
| 6,195,253 | B1 * | 2/2001 | Fahlgren | H02B 5/00 200/48 A |
| 6,322,375 | B1 | 11/2001 | Cole et al. | |
| 6,417,443 | B1 | 7/2002 | Smith | |
| 6,695,421 | B1 | 2/2004 | Frase et al. | |
| 7,417,846 | B2 | 8/2008 | Arioka | |
| 7,518,851 | B2 | 4/2009 | Tsuchiya et al. | |
| 7,813,109 | B2 * | 10/2010 | Kikukawa | H01H 33/6661 218/118 |
| 7,952,855 | B2 * | 5/2011 | Sletten | E21B 33/0355 218/118 |
| 7,952,857 | B1 * | 5/2011 | Motley | H02B 13/025 361/678 |
| 7,974,078 | B2 * | 7/2011 | Coomer | H02B 13/025 312/236 |
| 8,045,322 | B2 | 10/2011 | Kurogi et al. | |
| 8,248,760 | B2 | 8/2012 | Abrahamsen et al. | |
| 8,733,855 | B2 * | 5/2014 | Josten | H02B 13/025 174/50 |
| 8,743,532 | B2 * | 6/2014 | Yano | H02B 1/56 165/104.33 |
| 9,198,308 | B2 | 11/2015 | Lebo et al. | |
| 9,270,094 | B2 | 2/2016 | Yoshida et al. | |
| 2004/0020873 | A1 * | 2/2004 | Henderson | H02B 1/54 211/26 |
| 2007/0193190 | A1 * | 8/2007 | Konstant | A47B 91/00 52/693 |
| 2008/0007896 | A1 * | 1/2008 | Tsuchiya | H02B 11/02 361/612 |
| 2009/0107943 | A1 * | 4/2009 | Konstant | B65G 1/02 211/191 |
| 2009/0272559 | A1 | 11/2009 | Richter et al. | |
| 2011/0304957 | A1 * | 12/2011 | Lunden | H02B 1/14 361/622 |
| 2012/0044616 | A1 * | 2/2012 | Takahashi | H02B 1/56 361/611 |
| 2013/0327623 | A1 | 12/2013 | Kozuru et al. | |
| 2014/0002961 | A1 * | 1/2014 | Kobayashi | H02B 1/54 361/611 |

FOREIGN PATENT DOCUMENTS

| | | |
|---|---|---|
| JP | 57-127505 U | 8/1982 |
| JP | 57-156604 A | 9/1982 |
| JP | 58-21285 U | 2/1983 |
| JP | 58-46209 U | 3/1983 |
| JP | 58-159608 A | 9/1983 |
| JP | 60-86012 U | 6/1985 |
| JP | 62-178707 U | 11/1987 |
| JP | 62-262607 A | 11/1987 |
| JP | 63-160004 U | 10/1988 |
| JP | 2-126507 A | 5/1990 |
| JP | 3-082309 A | 4/1991 |
| JP | 3-256507 A | 11/1991 |
| JP | 07-255107 A | 10/1995 |
| JP | 10-313512 A | 11/1998 |
| JP | 2000-324624 A | 11/2000 |
| JP | 2002-076647 A | 3/2002 |
| JP | 2002-112416 A | 4/2002 |
| JP | 2008-043181 A | 2/2008 |

OTHER PUBLICATIONS

International Search Report (PCT/ISA/210) mailed on Aug. 7, 2012, by the Japanese Patent Office as the International Searching Authority for International Application No. PCT/JP2012/063860.
Office Action issued on Oct. 7, 2014, by the Japanese Patent Office in corresponding Japanese Patent Application No. 2013-526778 and an English translation of the Office Action. (7 pages).
European Search Report dated Mar. 2, 2015 issued in corresponding European Patent Appln. No. 12819479.2 (9 pages).
Office Action (Reason) issued on Aug. 18, 2015 by the Japanese Patent Office in corresponding Japanese Application No. JP 2014-232377 and a partial English translation thereof. (7 pgs).
Office Action issued by the U.S. Patent and Trademark Office in U.S. Appl. No. 15/044,520, mailed Jun. 14, 2016, U.S. Patent and Trademark Office, Alexandria, VA. (10 pages).
Office Action issued by the U.S. Patent and Trademark Office in U.S. Appl. No. 14/126,724, mailed Feb. 23, 2016, U.S. Patent and Trademark Office, Alexandria, VA. (13 pages).
Office Action issued on Feb. 3, 2017, by the U.S. Patent and Trademark Office in the copending U.S. Appl. No. 15/044,520. (12 pages).
Office Action issued by the U.S. Patent and Trademark Office in U.S. Appl. No. 15/044,520, mailed Nov. 3, 2016, U.S. Patent and Trademark Office, Alexandria, VA. (15 pages).

* cited by examiner

ENCLOSED SWITCHBOARD

This application is a Divisional of U.S. application Ser. No. 14/126,724 filed on Dec. 16, 2013, which is a National Stage of International Application No. PCT/JP2012/063860 filed on May 30, 2012, which claims the benefit of Japanese Application No. 2011-166375 filed on Jul. 29, 2011, Japanese Application No. 2011-168998 filed on Aug. 2, 2011, and Japanese Application No. 2011-196815 filed on Sep. 9, 2011. The disclosures of the prior applications are hereby incorporated by reference herein in their entirety.

TECHNICAL FIELD

The present invention relates to an enclosed switchboard in which a plurality of boards including a dedicated board for cable connection processing are arranged side by side and, more particularly, relates to the structure of a cable connection board, the structure of an enclosed switchboard which reduces damage due to fire and water disaster, and a fixing structure which fixes a floor portion of an enclosed switchboard required for aseismic performance.

BACKGROUND ART

In the structure of a conventional enclosed switchboard arranged side by side, main circuit cables for lead-in and lead-out are connected to individual housings (boards), respectively, as shown in FIG. 17. More specifically, in a conventional unit configuration, a cable lead-in board 81 which leads in cables, a circuit breaker containing board 82 in which circuit breakers and the like are contained, and a cable lead-out board 83 which leads out cables are arranged side by side from the left side of FIG. 17. In this manner, lead-in cables and lead-out cables are individually contained in two different housings, respectively.

Incidentally, there is a case where a box for connecting cables is provided on the upper portion of an enclosed switchboard, and cables are connected in the box.

Furthermore, for example, there is a generally known switchboard which is configured such that a plurality of circuit breakers are arranged up and down in a circuit breaker compartment provided on the front side of the inside of a housing, a main busbar compartment and a cable compartment are provided behind the circuit breaker compartment, one end side of each circuit breaker is connected to a main busbar disposed in the main busbar compartment, and the other end side is connected to a load cable in the cable compartment to be led out to the outside (for example, see Patent Document 1).

Besides, the following technique is disclosed as the configuration of a switchboard which takes into account disaster prevention against fire disaster or the like. For example, in a conventional enclosed switchboard shown in FIG. 6 of Patent Document 2, circuit breakers, cables, devices such as busbars are contained in a circuit breaker compartment, a cable compartment, and a busbar compartment, respectively; and each compartment is partitioned by a grounding metal. Furthermore, in a conventional enclosed switchboard shown in FIG. 1 of Patent Document 2, the enclosed switchboard is divided into three blocks of a cable compartment, a busbar compartment, and a circuit breaker compartment; a partition plate is provided in a boundary between the cable compartment and the busbar compartment; air ducts communicated with other are provided in a boundary between the busbar compartment and the circuit breaker compartment and on the lower portion and the upper portion of the enclosed switchboard; a gradient is formed in the air duct of the upper portion; and a fan is provided in an exit of the air duct. Further, a thermoelectric element is provided at a boundary with the air duct on the upper portion of the cable compartment, the busbar compartment, and the circuit breaker compartment.

By such a configuration, indoor air whose temperature rises during energization is released to the outside with a fan while exchanging heat by the thermoelectric element; and the enclosed switchboard is divided into several blocks to prevent fire spread to other blocks even when a fire disaster occurs.

Furthermore, in other conventional enclosed switchboard disclosed in Patent Document 3, there is a structure in which, in the enclosed switchboard in which a plurality of boards are arranged side by side as shown in FIGS. 18 and 19, two partition plates 90 of grounding metal are provided between the adjacent enclosed switchboards and a fire-retardant plate 88 and a gasket 89 are inserted over the whole surface between the partition plates 90; and thus, heat to adjacent circuit breaker boards is blocked to prevent the spread of a fault in the case of fire disaster in the circuit breaker board.

Besides, as the fixing structure of a conventional switchboard which takes into account seismic adequacy, for example, a fixing device like FIG. 20 is known. FIG. 20A is a perspective view of a floor fixing portion; and FIG. 20B is a side sectional view in which FIG. 20A is seen from an arrow direction b. The configuration is made such that, among frames that constitute a housing of the switchboard, a thick flat plate 92 thicker in thickness than a base portion frame 91 is fixed at a corner portion of the base portion frames 91 by being welded to a right angle portion coming into contact on the same flat surface, a foundation bolt 93 embedded in the floor is made to pass through an attaching hole 92a formed in the thick flat plate 92, and clamping is made by a nut 95 via a washer 94 from the upper side; and thus, the switchboard is fixed to a foundation surface (see Patent Document 4).

PRIOR ART DOCUMENT

Patent Document

[Patent Document 1] Japanese Unexamined Patent Publication No. 2008-43181 (Page 2, FIG. 1)

[Patent Document 2] Japanese Unexamined Patent Publication No. H3-256507

[Patent Document 3] Japanese Unexamined Utility Model Publication No. S63-160004

[Patent Document 4] Japanese Utility Model Publication No. S58-21285 (Page 2, FIGS. 3 and 4)

SUMMARY OF THE INVENTION

Problems to be Solved by the Invention

In the enclosed switchboard in which a plurality of enclosed switchboards are arranged side by side, lead-in and lead-out cables may be a charged portion and a non-charged portion, respectively, in the structure of the housing of the conventional enclosed switchboard; and therefore, a cable is considered to be separated in order to secure safety during work and the lead-in and lead-out cables are arranged in individual housings, respectively. Such a configuration has a problem in that a wide space is needed as a cable processing space; and accordingly, the whole outside dimensions become large when the enclosed switchboards are arranged side by side and an installation area of a building in which the enclosed switchboards are arranged becomes commensurately large.

Besides, in the configuration in which the box for connecting cables is arranged on the upper portion of the housing without providing a dedicated housing for cable connection in order to reduce an arrangement space, a large and heavy box is placed on the upper portion of the housing, and accordingly, the center of gravity is elevated and aseismic performance lowers and an aseismic reinforcement needs to be provided in the case where aseismic performance is required.

Further, as in Patent Document 1, in the switchboard of the configuration in which the cable compartment for lead-out cables is arranged behind the circuit breaker compartment, a problem exists in that a board for cable lead-in needs to be separately provided.

Furthermore, as for an enclosed switchboard which takes into account disaster prevention against fire disaster or the like, partition mechanisms between the circuit breaker compartment and the busbar compartment, between the busbar compartment and the cable compartment, between the circuit breaker compartment and the cable compartment, and between the circuit breaker boards are not sufficient in the conventional example of Patent Document 2; and in the case where the partition plate is burnt out and melted by heat due to flames when a fire disaster occurs, there is a possibility to bring large damage to a compartment other than a compartment in which the fire disaster occurs. In addition, in the conventional example of Patent Document 3, a problem exists in that the structure is complicated and it becomes high cost.

Moreover, a problem is to provide a structure in which water is not intruded into an important circuit even when water is partially intruded into the circuit breaker board and the circuit breaker board can be recovered promptly.

Besides, in the conventional fixing structure shown in Patent Document 4 as the conventional enclosed switchboard which takes into account seismic adequacy, the thick flat plate 92 is welded and fixed to the base portion frames 91 at four corners of the housing as the members for mounting the foundation bolt. However, a problem exists in that the thick flat plate 92 is individually provided at each corner; and accordingly, the strength of the fixing portion is not necessarily sufficient and the base portion frame 91 is likely to be deformed depending on large vibrations due to an earthquake or the like, the weight and the position of the center of gravity of the switchboard, and the like.

Furthermore, when the thick flat plate 92 is welded, welding is difficult to keep the distance between bolt holes within tolerance in accordance with dimensions between the left and right foundation bolts and between the front and back foundation bolts, and it also takes working time. For this reason, generally, the hole diameter of the attaching hole 92a is a larger size or a longer hole than a standard bolt hole of the corresponding foundation bolt 93 taking into account attaching errors and manufacturing errors of components and clamping is made by means of a large diameter and thick special washer; and accordingly, the special washer is needed.

The invention has been made to solve the problem described above, and an object of the present invention is to obtain an enclosed switchboard capable of reducing an installation area even when a dedicated board for cable lead-in and lead-out is provided.

Moreover, an object of the invention is to minimize damage due to fire and water disaster by improving separation performance of a circuit breaker board with the aim of improving disaster prevention property.

Furthermore, an object of the invention is to obtain an enclosed switchboard which enhances rigidity of a fixing portion to be fixed to a foundation and improves seismic adequacy.

Means for Solving the Problems

According to the present invention, there is provided an enclosed switchboard including: a device containing board which contains main circuit devices; and a cable connection board which is arranged side by side adjacently to the device containing board, and contains cables that input and output electric power to/from the main circuit devices. In the enclosed switchboard, the cable connection board is configured by one housing; and the inside of the housing is divided into two by a partition plate to be comparted to a cable lead-in compartment which contains lead-in side cables and a cable lead-out compartment which contains lead-out side cables.

Moreover, there is provided an enclosed switchboard including a housing which includes: a circuit breaker compartment which contains circuit breakers stacked in upper and lower stages; a busbar compartment which contains busbars connected to each of the circuit breakers; and upper stage and lower stage cable compartments each of which contains cables connected to each of the circuit breakers. The circuit breaker compartment is arranged, and the busbar compartment and the upper stage and lower stage cable compartments are arranged behind the circuit breaker compartment. In the enclosed switchboard, the housing is arranged in plural rows, and includes air heat insulation layers for shielding heat. Each of the air heat insulation layers is provided: between both adjacent side walls of the housings disposed in parallel; on a ceiling portion of the circuit breaker compartment; on a partition portion between the circuit breakers stacked in stages; on a partition portion between the upper stage cable compartment and the lower stage cable compartment; and on a back wall portion of the circuit breaker compartment, the back wall portion coming into contact with the busbar compartment and either one or both of the upper stage and lower stage cable compartments.

Furthermore, there is provided an enclosed switchboard including a housing whose outline is formed in a substantially cuboid shape by combining a vertical frame, a width directional frame, and a depth directional frame. In the enclosed switchboard, the housing includes: a pair of vertical frames arranged in face-to-face relation on the left and the right in the width direction of the housing; a floor side width directional frame provided so as to connect the lower sides of the vertical frames; and a reinforcing member for fixing the housing. The reinforcing member is made of a plate thicker than the thickness of each of the frames and has a length whose both ends come into contact with the pair of the vertical frames, and the reinforcing member is arranged on a floor plate of the housing and fixed to the lower sides of the pair of the vertical frames and the floor side width directional frame by welding.

Advantageous Effect of the Invention

According to the enclosed switchboard of present invention, the cable connection board is configured by one housing and the inside of the housing is divided into two by the partition plate to be comparted to the cable lead-in compartment which contains lead-in side cables and the cable lead-out compartment which contains lead-out side cables; and therefore, the lead-in side cables and the lead-out side cables are contained in the same housing. Consequently, as compared to the case where the lead-in side cables and the lead-out side cables are contained in individual housings, cable connection processing can be performed in one side; and therefore, connection work can be easily performed and an installation space of the enclosed switchboard can be reduced.

Moreover, the heat insulation layers is provided between the front circuit breaker compartment and each of the respective back compartments and between the circuit breaker boards, whereby separation performance of the respective compartments and the circuit breaker boards can be enhanced and heat due to flames on the occurrence of fire disaster in the circuit breaker board can be prevented from being transmitted and spread to other circuit breakers and other compartments. In addition, combination use with the metallic barrier is easy and therefore the effect of heat blockage can be further improved.

Furthermore, the reinforcing member for fixing the housing, the reinforcing member being made of a thicker plate and having a length whose both ends come into contact with the pair of the vertical frames, is arranged on the floor plate of the housing and fixed to the lower sides of the pair of the vertical frames and the floor side width directional frame by welding, whereby rigidity of the floor of the enclosed switchboard can be enhanced and the enclosed switchboard excellent in seismic adequacy can be provided.

BRIEF DESCRIPTION OF THE DRAWINGS

FIG. 7A is a side sectional view, and FIG. 7B is a back view in which laterally disposed two enclosed switchboards are seen from the back;

FIG. 9 is a front view in which FIG. 8 is seen from the front;

FIG. 10 is a back view in which FIG. 8 is seen from the back;

MODE FOR CARRYING OUT THE INVENTION

Figure 1:
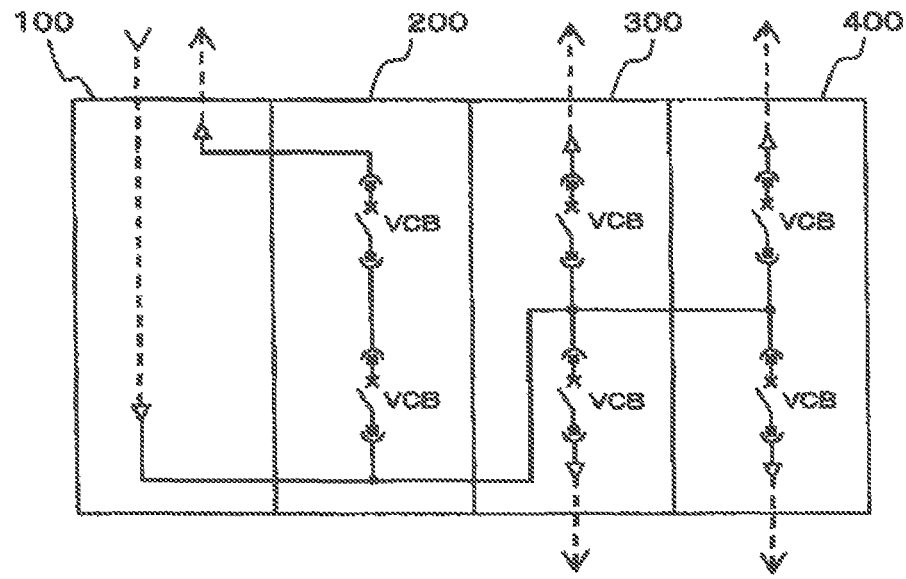
FIG. 1 is a side-by-side board configuration view in which an example of an enclosed switchboard with a unit configuration by a side-by-side board arrangement according to Embodiment 1 of the present invention is shown in a block skeleton.

First, the whole configuration of an enclosed switchboard in which a plurality of switchboards each contained in a metal case are arranged side by side. FIG. 1 is the side-by-side board configuration view in which an example of a unit configuration of an enclosed switchboard is shown in a block skeleton; and FIG. 2 is a perspective view showing an external appearance of the enclosed switchboard configured as shown in FIG. 1.

Incidentally, the enclosed switchboard to be an object of the present application is equivalent to one which is ordinarily referred to as switchgear; and therefore, a term is standardized to "enclosed switchboard" in the present invention.

In FIG. 1, the unit is configured from the left side by a cable connection board 100 which receives electric power supply by cables from an upper system, a circuit breaker containing board 200 in which circuit breakers VCB are contained, and feeder boards 300 and 400 which supply electric power to a feeder via two circuit breakers VCB connected to the circuit breaker containing board 200 and main busbars. Incidentally, the unit configuration of the drawing is typically shown, but not limited to this.

Figure 2:
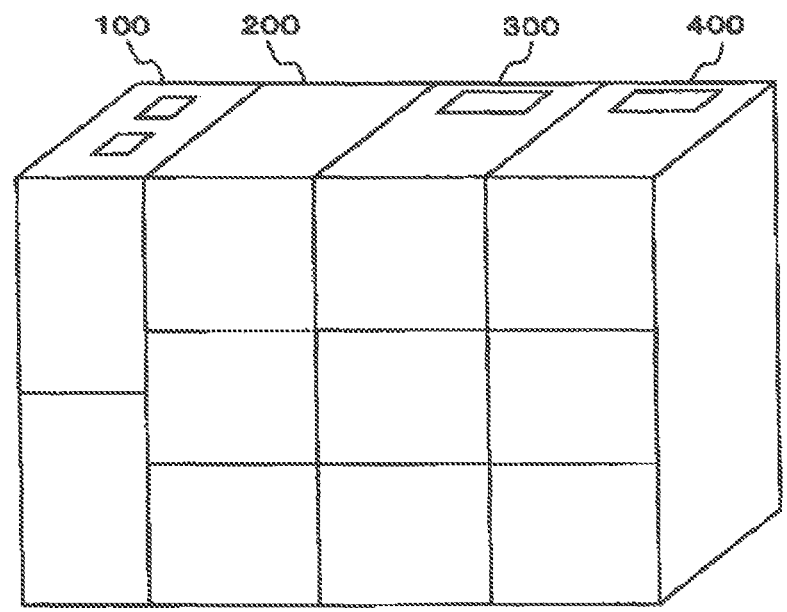
FIG. 2 is a perspective view showing an external appearance of the side-by-side board configuration of FIG. 1.

As shown in the perspective view of FIG. 2, each board which constitutes the enclosed switchboard contains circuit breakers, busbars, cables, or the like in a metallic housing, and each board is formed with an opening portion which is for lead-in or lead-out of outside line cables on the ceiling side or the floor side of the housing.

The present invention improves installation workability, disaster prevention property, and seismic adequacy in the respective boards which are arranged side by side and respective characteristic portions will be described in the following.

Embodiment 1

Figure 3:
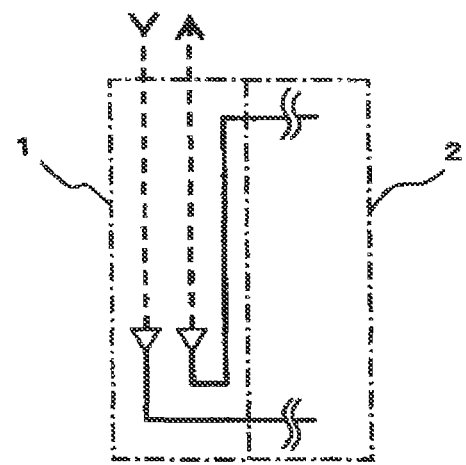
FIG. 3 is a single line diagram for explaining the configuration of cable lead-in and lead-out portions of the enclosed switchboard according to Embodiment 1 of the present invention.

Hereinafter, the enclosed switchboard of Embodiment 1 will be described with reference to drawings. FIG. 3 is a single line diagram for explaining the configuration of the enclosed switchboard according to Embodiment 1 of the present invention.

As shown in the drawing, a cable connection board 1, in which lead-in cables and lead-out cables can be connected in one housing, and a device containing board 2, in which main circuit devices such as circuit breakers to be connected to the cable connection board 1 are contained, are arranged side by side. The configuration is made such that the device containing board 2 is ordinarily composed of a plurality of boards and those boards are arranged side by side to one cable connection board 1.

When FIG. 3 is compared to the aforementioned FIG. 1, the cable connection board 1 corresponds to a cable connection board 100 of FIG. 1 and the device containing board 2 corresponds to the circuit breaker containing board 200 and subsequent boards.

Figure 4:
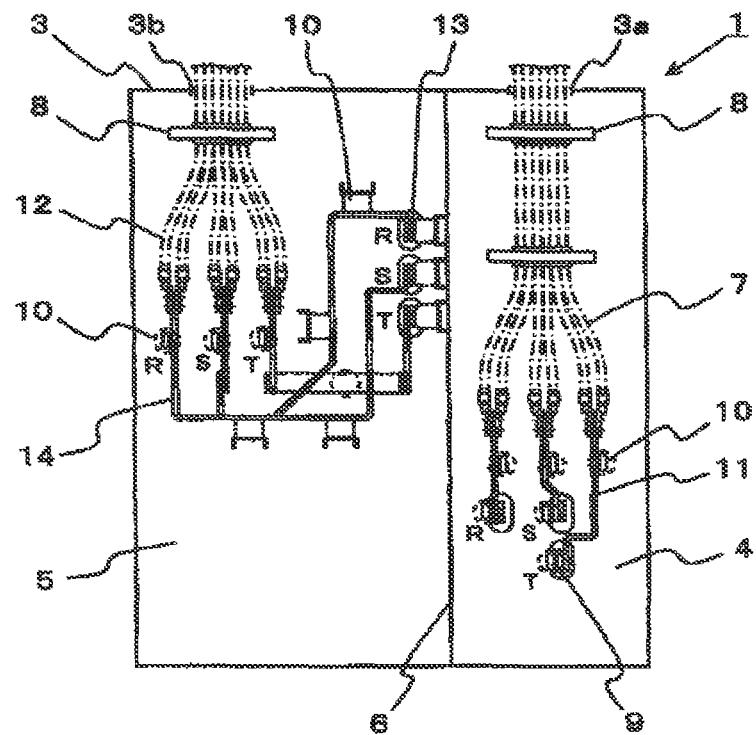
FIG. 4 is an internal structure view of a cable connection board of the enclosed switchboard according to Embodiment 1 of the present invention.

FIG. 4 is a side view showing the internal structure of the cable connection board 1 of the enclosed switchboard according to Embodiment 1. The inside of a housing 3 is divided into two by a partition plate 6 to be compared to a cable lead-in compartment 4 and a cable lead-out compartment 5. The partition plate 6 is made of, for example, a similar steel plate as the housing; however, an insulation plate may be used. A characterizing part of the present application is that the structure is made such that, for example, even when the lead-in side is charged, work can be performed safely on the lead-out side by completely partitioning by the partition plate 6 and both compartments are contained in one housing 3. Incidentally, in the drawing, the left is the front and the right is the back.

Lead-in side cables 7 for three phases are led in from a lead-in port 3a on the upper side of the cable lead-in compartment 4 and are supported and fixed to a sidewall by a support member 8. Respective cable terminals and lead-in side main busbars 9 of three phases are connected via connection conductors 11 supported to the sidewall by supporting insulators 10.

On the other hand, lead-out side cables 12 are led out from a lead-out port 3b on the upper side of the cable lead-out compartment 5, and terminals of the lead-out side cables 12 and three phase lead-out side main busbars 13 are connected via connection conductors 14 supported to the sidewall by the supporting insulators 10.

The cable lead-out compartment 5 takes a wider space than the cable lead-in compartment 4 and an arrangement path of the connection conductors 14 is devised to make a phase sequence of the lead-in cables coincide with that of the lead-out cables.

The lead-in port 3a and the lead-out port 3b for cables are both provided on the upper surface of the cable connection board 1 in FIG. 4; however, both ports may be provided on the lower surface of the cable connection board 1 to lead in and lead out the cables from the lower side. There is a case where the cables are disposed on the ceiling side or are disposed in a pit on the floor side depending on building circumstances in which the enclosed switchboard is installed; and therefore, it may be appropriately selected so that a pull-around of the cables becomes easy depending on installation circumstances.

The arrangement of the main busbars to be connected to the cables is determined in accordance with the device arrangement of the device containing board to be arranged side by side. In the case of this embodiment, as to be described in the following, the lead-in side main busbars 9 are arranged in delta on the lower portion of the cable lead-in compartment 4 in accordance with the main busbar arrangement of a circuit breaker containing board 2 (device containing board) which contains circuit breakers stacked in two stages; and thus, the configuration is made such that a space in the circuit breaker containing board 2 is effectively used.

On the other hand, the lead-out side main busbars 13 are arranged to be disposed in a vertical direction on the upper portion near the partition plate 6 of the cable lead-out compartment 5.

Incidentally, the arrangement of the cable lead-in compartment 4 and the cable lead-out compartment 5 may be arranged with left-right reversal depending on the inside configuration of the circuit breaker containing board 2.

Figure 5:
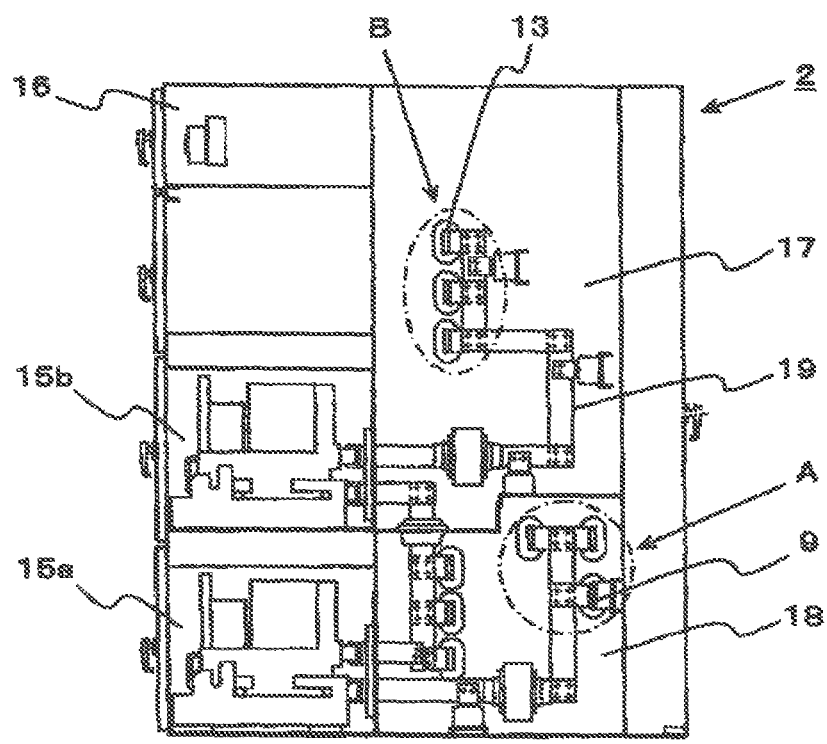
FIG. 5 is a view showing the internal structure of a circuit breaker containing board which is arranged side by side to a cable connection board according to Embodiment 1 of the present invention.

FIG. 5 is the device containing board which is arranged side by side adjacently to the cable connection board 1 of FIG. 4. The circuit breaker containing board 2 which contains the circuit breakers will be described as an example of the device containing board. The drawing is a side view showing the internal structure thereof.

The inside of a housing of the circuit breaker containing board 2 is comparted to a lower circuit breaker compartment 15a and an upper circuit breaker compartment 15b from the lower side of the front (the left side in the drawing) and the circuit breaker is contained in each compartment. The further upper side of the upper circuit breaker compartment 15b is a controller compartment 16. The upper side of the back side is a lead-out side main busbar compartment 17 and the lower side thereof is a lead-in side main busbar compartment 18. Each compartment is partitioned by a partition plate.

As shown by A in FIG. 5, three phase lead-in side main busbars 9 are arranged in a delta shape in the lead-in side main busbar compartment 18 and are integrally connected with the lead-in side main busbar 9 of the aforementioned cable connection board 1 side.

Furthermore, as shown by B in FIG. 5, three phase lead-out side main busbars 13 are arranged in a vertical direction in the lead-out side main busbar compartment 17 and are integrally connected with the lead-out side main busbar 13 of the cable connection board 1 side.

The upper and lower circuit breakers are configured to be connected in series between the lead-in side main busbars 9 and the lead-out side main busbars 13. Terminals for three phases of the circuit breakers are disposed in a direction perpendicular to the page space and respective terminals are connected to the busbars of corresponding phases via branch busbars 19.

Incidentally, the arrangement configuration of the main circuit devices in the circuit breaker containing board 2 shows an example, but not limited to FIG. 5.

As described above, according to the enclosed switchboard of Embodiment 1, the enclosed switchboard includes: the device containing board which contains main circuit devices; and the cable connection board which is arranged side by side adjacently to the device containing board, and contains cables that input and output electric power to/from the main circuit devices. In the enclosed switchboard, the cable connection board is configured by one housing; and the inside of the housing is divided into two by the partition plate to be comparted to the cable lead-in compartment which contains lead-in side cables and the cable lead-out compartment which contains lead-out side cables; and therefore, the lead-in side cables and the lead-out side cables are contained in the same housing. Consequently, as compared to the case where the lead-in side cable and the lead-out side cable are contained in individual housings, cable connection processing can be performed in one side; and therefore, connection work can be easily performed and the installation space of the enclosed switchboard can be reduced.

Further, as compared to the conventional configuration in which the cable connection board is not provided and the box for connecting cables are arranged on the upper portion of the housing of the enclosed switchboard, the center of gravity of the whole board is lowered and thus aseismic performance is improved.

Besides, the lead-in port of the lead-in side cables and the lead-out port of the lead-out side cables are formed on either side of the upper surface or the lower surface of the cable connection board. Consequently, a pull-around path of the cables can be selected in accordance with circumstances of a placing location of the enclosed switchboard; and therefore, the path is shortened and cable wiring can be simplified.

Embodiment 2

Figure 6:
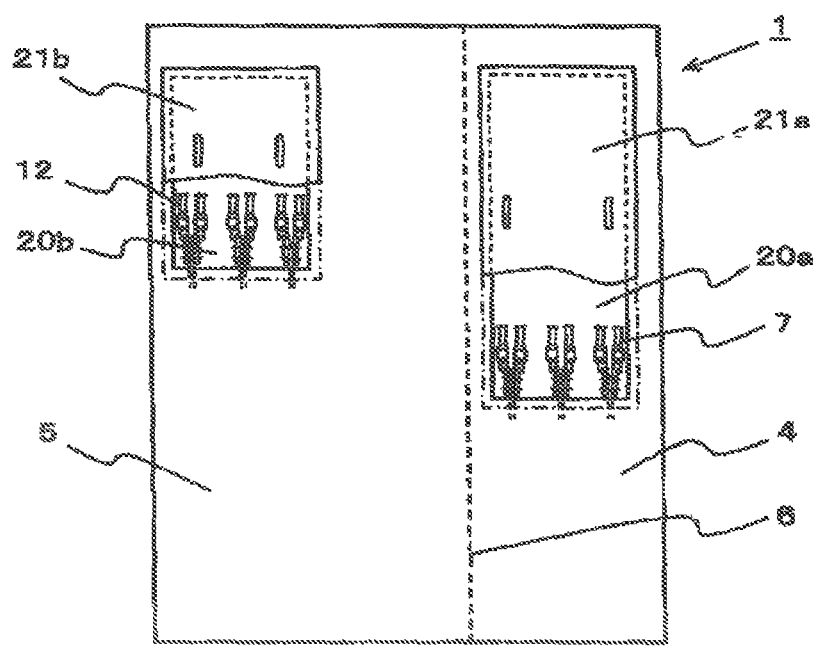
FIG. 6 is a side view of a cable connection board of an enclosed switchboard according to Embodiment 2 of the present invention.

FIG. 6 is a side view of a cable connection board of an enclosed switchboard according to Embodiment 2 of the present invention and a view seen from the side opposite to the side to be connected to a device containing board when arranged side by side. The inside configuration in the board is equivalent to FIG. 4 of Embodiment 1; and therefore, the same reference numerals and letters are given to equivalent portions and their description will be omitted.

As shown in the drawing, opening portions 20a and 20b capable of performing cable connection work are provided, respectively, in response to portions where the cable lead-in compartment 4 and the cable lead-out compartment 5 are arranged; and detachable working covers 21a and 21b are attached thereto.

In consideration of lead-in work of cables from the upper portion, the size of the opening portions 20a and 20b is set from a portion near an upper end portion of the board to the vicinity of cable terminals at which cable connection processing is actually performed, which resulted in a size sufficient for performing visual confirmation during cable clamping work and inspection. Naturally, in the case where the lead-in and lead-out ports of the cables are located on the lower side, the opening portions 20a and 20b and working covers 21a and 21b are provided at positions corresponding thereto.

The size of the working covers 21a and 21b and the opening portions 20a and 20b is reduced to a range capable of performing connection inspection work; and thus, the weight of the working covers 21a and 21b can be reduced, thereby removing and attaching easily. Therefore, opening and closing become easier as compared to the case where the whole door is opened and closed.

As described above, according to the enclosed switchboard of Embodiment 2, the cable lead-in compartment and the cable lead-out compartment of the cable connection board are provided with the working opening portion and the working cover for covering the opening portion, respectively, on a surface opposite to the side facing the device containing board. Therefore, cable connection work can be easily performed, and confirming work and clamping work in periodic inspection or the like are also easy and thus workability is improved.

Embodiment 3

Next, an enclosed switchboard according to Embodiment 3 will be described. This embodiment relates to the enclosed switchboard which reduces damage due to fire and water disasters. The enclosed switchboard is a board corresponding to the feeder boards 300 and 400 in the unit configuration described in FIG. 1. In this regard, however, a device arrangement of the inside shows an example, and the arrangement is not assumed to be directly connected to the circuit breaker containing board 2 of Embodiment 1. Therefore, even when reference numerals and letters of respective constituent elements are equivalent to those of Embodiment 1, different reference numerals and letters are assigned thereto.

The enclosed switchboard in Embodiment 3 shown in FIGS. 7 to 10 includes: air heat insulation layers A which block heat due to flames when a fire disaster occurs; and metallic barriers B which block flames of the fire disaster generated in a main circuit of a drawing type circuit breaker 40 to protect a control circuit. Relevant devices such as the circuit breaker 40, the main circuit, and the control circuit are arranged at a higher level than an anticipated water intrusion water-level. The specific location and the configuration of the air heat insulation layers A and the metallic barrier B will be described later. FIG. 7A is a side sectional view and FIG. 7B is a back view.

Figure 7A:
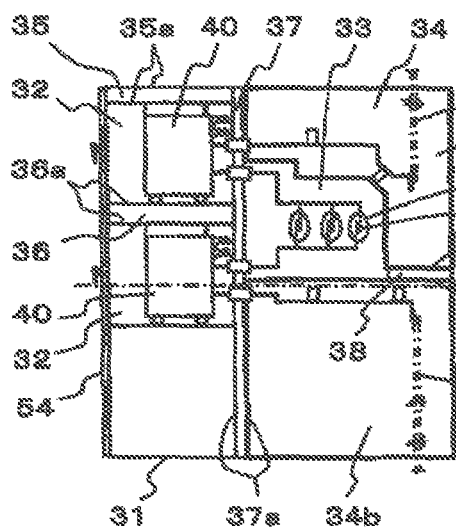
FIGS. 7A and 7B show the whole of an enclosed switchboard according to Embodiment 3 of the present invention.
Figure 7B:
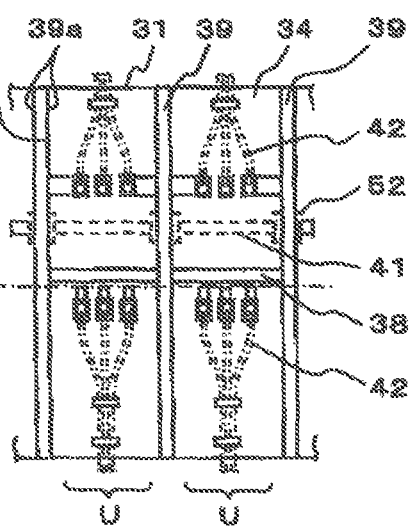

In FIGS. 7A and 7B, a circuit breaker board U of the enclosed switchboard includes circuit breaker compartments 32 stacked in stages on the front of a housing 31, a busbar compartment 33 provided on the back of the housing 31, a back compartment 34 composed of cable compartments of an upper stage 34a and a lower stage 34b, and the like. These compartments are arranged side by side in the housing 31; and, for example, the air heat insulation layers A for shielding heat, which block the heat due to flames when a fire disaster occurs, are formed at each portion of the respective compartments 32, 33, and 34.

Incidentally, the circuit breaker compartment 32 is a compartment in which the circuit breaker 40 and a control instrument 56 attached on the back of a front door 54 are contained and arranged in the inside; the busbar compartment 33 is a compartment in which busbars 41 serving as the main circuit are contained and arranged in the inside; and the busbars 41 are connected to the respective circuit breakers 40.

Furthermore, the upper stage and lower stage cable compartments 34a and 34b are compartments in which outside line cables for the main circuit 42 serving as the main circuit are contained and arranged in the inside, and the outside line cables for the main circuit 42 are connected to the respective circuit breakers 40.

Further, the circuit breaker board U is arranged in plural rows in the housing 31 and constitutes a part of the unit of the enclosed switchboard.

The air heat insulation layers A have a function to block heat due to flames when a fire disaster occurs and are composed of the following: a first air heat insulation layer 39 provided between both adjacent side walls of the circuit breaker boards provided in parallel; a second air heat insulation layer 35 provided on a ceiling portion of the upper circuit breaker compartment 32; a third air heat insulation layer 36 provided on a partition portion between the circuit breakers 40 stacked in stages, more specifically, between the upper and lower circuit breaker compartments 32; a fourth air heat insulation layer 38 provided between the busbar compartment 33 and the back compartment 34 (not shown in the drawing) and on the partition portion between the cable compartments of the upper stage 34a and the lower stage 34b; a fifth air heat insulation layer 37 provided on a back wall portion of the circuit breaker compartment coming into contact with the busbar compartment 33 and the back compartment 34, more specifically, provided between the circuit breaker compartment 32 and the back compartment 34.

Furthermore, the respective air heat insulation layers A (the first air heat insulation layer 39 to the fifth air heat insulation layer 37) are each formed by the following member.

Figure 8:
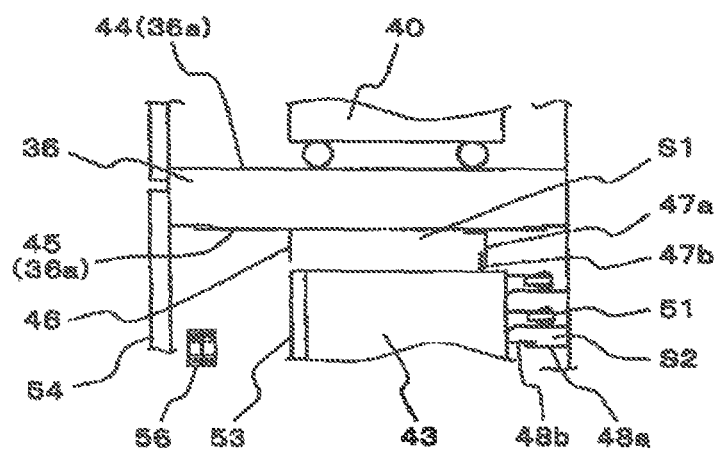
FIG. 8 is a side sectional view showing a metallic barrier portion of the enclosed switchboard according to Embodiment 3 of the present invention.

More specifically, the first air heat insulation layer 39 is formed by two partition plates between boards 39a serving as both adjacent side walls; the second air heat insulation layer 35 is formed by forming a ceiling plate 35a in a double structure; the third air heat insulation layer 36 is formed by a floor plate 44 (36a of FIG. 7) for fixing the circuit breakers and a cover 45 (36a) clamped with bolts as shown in FIG. 8; the fourth air heat insulation layer 38 is formed by a partition plate 38a between the upper stage and lower stage cable compartments 34a and 34b; and the fifth air heat insulation layer 37 is formed by two back plates 37a for fixing the circuit breakers between the front and back compartments.

In this manner, when a fire disaster occurs in any of a plurality of circuit breaker boards, heat due to flames is prevented from being transmitted and spread to the busbar compartment 33 on the back of the circuit breaker board, the cable compartments of the upper stage 34a and the lower stage 34b, and the adjacent circuit breaker boards U by providing the air heat insulation layers A on the respective portions as described above. Further, a porcelain bushing 52 is attached to a busbar pass-through portion between the circuit breaker boards and thus independent separation can be made for each circuit and separation performance of the circuit breaker boards can be enhanced. Then, a separation is also made between the circuit breaker boards U; and thus, the heat due to flames on the occurrence of fire disaster in the circuit breaker board is prevented from being transmitted and spread to the busbar compartment 33 on the back of the circuit breaker board, other circuit breaker, other compartments 32 and 34, and the adjacent circuit breaker boards U.

Incidentally, Embodiment 3 exemplifies the air heat insulation layers A; however, the heat insulation layer is not limited to a gas like air, a nonflammable heat insulation material (glass wool, rock wool, or the like) can also be used.

Figure 9:
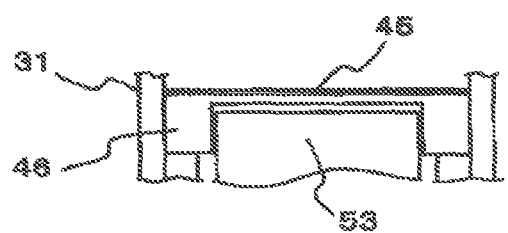
Figure 10:
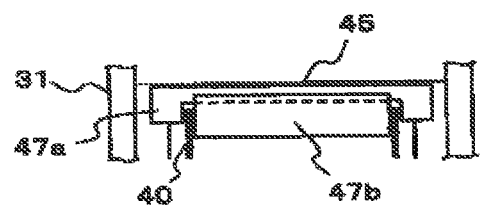

In FIGS. 8 to 10, the drawing type circuit breakers 40 stacked in upper and lower stages and contained in the circuit breaker compartment 32 are provided with the metallic barriers B which block the control instruments 56 or the like from flames in the case of fire disaster; and the metallic barriers B constitute an heat insulation mechanism by using in combination with the air heat insulation layers A.

The metallic barriers B are composed of a first metallic barrier 46, a second metallic barrier 47 (47a, 47b), and a third metallic barrier 48 (48a, 48b).

The first metallic barrier 46 is a metallic barrier which is attached on the housing 31 side between a circuit breaker arc extinction chamber 43 and the front door 54 side.

The second metallic barrier 47 is composed of a metallic barrier 47a attached on the housing 31 side and a metallic barrier 47b attached to the circuit breaker arc extinction chamber 43 side between the circuit breaker arc extinction chamber 43 and a circuit breaker secondary junction 51.

The third metallic barrier 48 is composed of a metallic barrier 48a attached to the housing 31 side and a metallic barrier 48b attached to the circuit breaker arc extinction chamber 43 side between a main circuit terminal (not shown in the drawing) of the circuit breaker 40 and the circuit breaker secondary junction 51.

A space is provided on the upper portion of a circuit breaker faceplate 53 so that the metallic barrier 46 serving as the first metallic barrier does not interfere with the circuit breaker faceplate 53.

Furthermore, the second metallic barrier 47 composed of the metallic barrier 47a and the metallic barrier 47b is provided in an upper space S1 between the circuit breaker arc extinction chamber 43 and the circuit breaker secondary junction 51.

Further, the third metallic barrier 48 composed of the metallic barrier 48a and the metallic barrier 48b is provided in a back space S2 formed on the back of the circuit breaker arc extinction chamber 43 between the main circuit terminal of the circuit breaker 40 and the secondary junction 51.

Besides, as shown in FIG. 8, the structure is made such that a slight gap is formed at a portion where the metallic barrier 47a and the metallic barrier 47b of the second metallic barrier 47 are overlapped with each other and at a portion where the metallic barrier 48a and the metallic barrier 48b of the third metallic barrier are overlapped with each other, so that flames are difficult to run round.

The main circuit of the circuit breaker 40 is separated from the control circuit by the metallic barrier B and thus the main circuit of the circuit breaker can be separated from the control circuit; and when a fire disaster occurs in the main circuit of the circuit breaker 40, flames are suppressed from being spread to the control circuit such as the control instrument 56, the circuit breaker secondary junction 51, and control cables and damage can be prevented from being spread.

In the enclosed switchboard in Embodiment 3 shown in FIG. 7, the relevant devices such as the main circuit and the control circuit are arranged at a higher level than an anticipated water-level of water intrusion in order to reduce damage in the case where water is intruded into the circuit breaker board U.

More specifically, the drawing type circuit breakers 40 are stacked in stages; the circuit breaker 40 of the upper stage, the busbar 41, the device to be contained, and inside members are arranged at a higher level; and control outside line cables and the outside line cables 42 for the main circuit of the upper stage circuit breaker are led out upward. Then, when the circuit stopped by a fault is expected to be recovered promptly, the structure is made such that important circuits are arranged on the upper stage side and upper and lower stage circuits are completely partitioned and separated. Therefore, even when water is partially intruded into the circuit breaker board U, if the water intrusion is under an upper limit 55 of the water-level capable of using the upper stage (a water-level at which water does not intrude into the busbar compartment 33), the structure of the board can be made such that the circuits on the upper stage side can be promptly recovered without influence due to the water intrusion.

Embodiment 4

Figure 11:
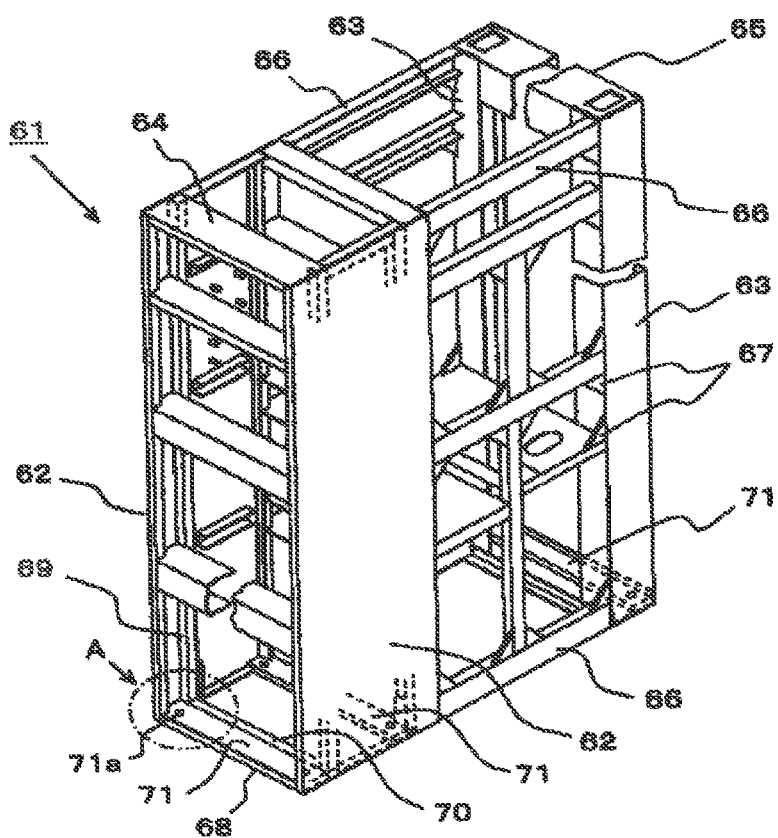
FIG. 11 is a perspective view of a housing of an enclosed switchboard provided with a board fixing structure according to Embodiment 4 of the present invention.
Figure 12:
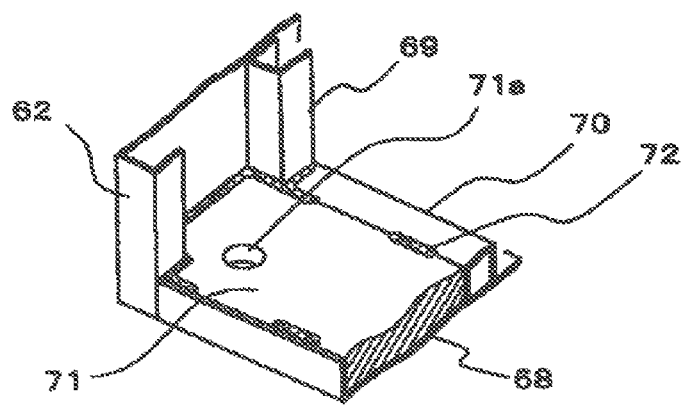
FIG. 12 is a detail view of a portion A of FIG. 11 and is a partial perspective view in a state where a reinforcing member is not present.
Figure 13:
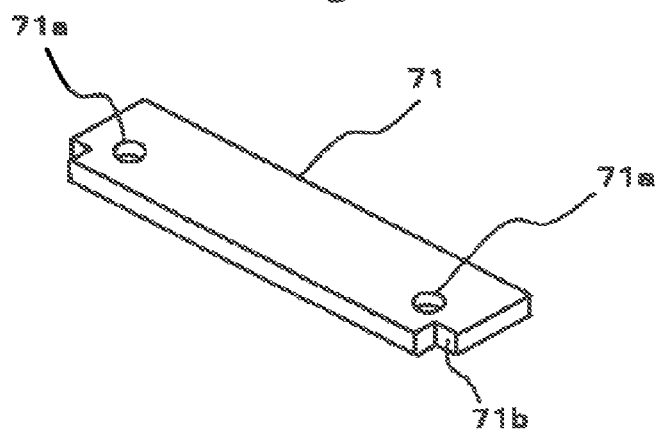
FIG. 13 is a perspective view of the reinforcing member to be used in FIG. 11.
Figure 14:
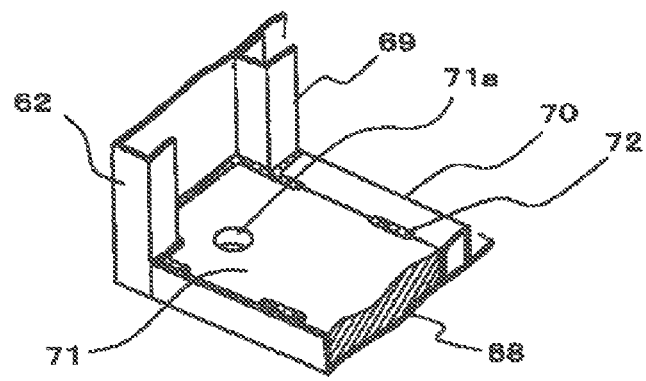
FIG. 14 is a perspective view in which the reinforcing member of FIG. 13 is combined with the partial perspective view of FIG. 12.

Hereinafter, Embodiment 4 will be described with reference to drawings. FIG. 11 is a perspective view of a housing for explaining the structure of a housing of an enclosed switchboard according to Embodiment 4; FIG. 12 is a perspective view of a portion A of FIG. 11; FIG. 13 is a perspective view of a reinforcing member for use in a foundation fixing portion; and FIG. 14 is a perspective view showing a state where the reinforcing member is welded to FIG. 12.

The enclosed switchboard shown in FIG. 11 exemplifies the frame configuration of the board, which corresponds to, for example, the board of FIG. 5 described in Embodiment 1. In this regard, however, the structure of a foundation portion (to be described later) can be applied to any of the cable connection board 100, the circuit breaker containing board 200, or the feeder boards 300 and 400 of FIG. 1.

Incidentally, reference numerals and letters of respective portions are different reference numerals and letters even if the respective portions are equivalent to those of Embodiments 1 to 3.

An outline of the housing 61 of the enclosed switchboard is formed in a substantially cuboid shape by appropriately combining a frame made of an angle steel or a channel steel, or a frame formed by bending a steel plate in an L-shape or a channel shape in cross section, or a frame that doubles as a side plate formed by bending both end portions of a wide steel plate, by welding, bolt clamping, or riveting so as to serve as a vertical frame, a width directional frame, and a depth directional frame. FIG. 11 shows an example thereof; and hereinafter, the structure of the housing will be described with reference to FIG. 11. Incidentally, for convenience of explanation, the description will be made that the left side of FIG. 11 is regarded as the front side. A left-right direction seen from the front side is referred to as a width direction; and a front-back direction is referred to as a depth direction.

A vertical frame 62 that doubles as a side plate formed by bending both end portions of a thin steel plate is arranged in a standing condition on the left and the right of the front side, a vertical frame 63 formed by bending in a channel shape in cross section is arranged in a standing condition on the left and the right of the back side, and the vertical frames 62 and 63 are integrally combined by width directional frames 64 and 65 connecting the left and the right and by depth directional frames 66 connecting the front and the back. Depending on the configuration and the size of devices to be contained in the switchboard, the width directional frames and the depth directional frames are also appropriately provided at intermediate portions in a vertical direction, and the vertical frames are also appropriately provided at intermediate portions in the depth direction; however the drawing is typified by reference numeral 64 to 66.

Incidentally, the number and the shape of the respective frames of FIG. 11 show an example, but not limited to the shape of the drawing.

Furthermore, when the housing 61 receives vibrations due to an earthquake or the like, the housing 61 is welded with a reinforcement plate 67 formed, for example, in a triangle shape at a portion where housing frames of weak strength are butted at a right angle, in order to prevent the switchboard from being deformed and to enhance the earthquake-resistance strength of the whole switchboard. Further, the floor side of the housing 61 is configured so as to be able to be fixed by foundation bolts (as to be described later) so that the housing 61 does not fall down by an earthquake or the like. Such a fixing device portion has the characteristics of this embodiment and therefore the fixing device portion will be described later.

FIG. 12 is an enlarged view of a portion A of FIG. 11 and shows a state before a reinforcing member (to be described later) is attached. The vertical frame 62 for doubling as the side plate is formed by bending the front side of a plate material in a channel shape and doubles as a front vertical frame and the side plate. A floor plate 68 is formed by bending the front side in an L-shape and also doubles as a front width directional frame. Vertical frames 69 arranged in face-to-face relation on the left and the right of the housing 61 are provided on the more back side than the front; and a floor width directional frame 70 is provided so as to connect the lower sides of the left and right vertical frames 69. The floor plate 68 is formed with a through hole 68a having an outer diameter larger than a hole for foundation 71a at a position corresponding to the hole for foundation 71a formed in a reinforcing member 71 (to be described next).

Incidentally, in addition to the vertical frame 62 doubling as the side plate as shown in the drawing, a vertical frame formed in an L-shape, a channel shape, or a hollow rectangular shape in cross section may be used on the left and the right of the front side; and a horizontal frame of a different member may also be used on the front side of the floor plate 68.

FIG. 13 is a perspective view showing the reinforcing member 71. The reinforcing member 71 is made of thick steel plate that is sufficiently thicker than the thickness of a member constituting each frame, and the length of the reinforcing member 71 is a length fitted to the inside of the left and right vertical frames or the side plates of the housing 61 without a substantial gap. Furthermore, the holes for foundations 71a are formed near length directional both end portions. Incidentally, the shape of cutout portions 71b formed on both end portions is different in accordance with the shape of the vertical frames to be combined.

FIG. 14 is a perspective view showing a state where the reinforcing member 71 of FIG. 13 is combined with a frame structure shown in FIG. 12. The reinforcing member 71 having a large thickness is mounted on the floor plate 68, both ends in the length direction of the reinforcing member 71 are come into contact with the lower insides of the vertical frames 62 doubling as the left and right side plates of the housing 61 and the lower sides of the vertical frames 69, and lateral faces of the reinforcing member 71 are come into contact with the frame portion of the front side of the floor plate 68 and the floor width directional frame 70; and the thus configured structure is fixed by welding.

Incidentally, the entire periphery of the butted portions does not need to be welded, but intermittent welding may be permissible as shown in the drawing as welding portions 72.

Furthermore, in FIG. 14, the reinforcing member 71 is welded at its front and back lateral faces to the front frame portion of the floor plate 68 and the floor width directional frame 70; however, the arrangement of the frame is non-uniform and therefore at least one of the lateral faces may be fixed to the width directional frame.

FIG. 12 to FIG. 14 describe about the reinforcing member 71 provided on the lower portion of the front side of the housing 61. However, the reinforcing member 71 is a member for fixing the housing 61 to the foundation surface; and therefore, the reinforcing member 71 is also provided on the lower portion of the back side as shown in FIG. 11.

Further, when the housing 61 is increased in size and the number of the devices to be contained is increased, loads of the circuit breakers and the like to be contained are applied on a depth directional intermediate portion; and therefore, as shown in FIG. 11, the configuration is made such that the similar reinforcing member 71 is provided in accordance with the vertical frames at the depth directional intermediate portions and the floor width directional frame at a position corresponding thereto, and the holes for foundation are formed near length directional both end portions of the reinforcing member 71 so as to be fixed by the foundation bolts.

Figure 15:
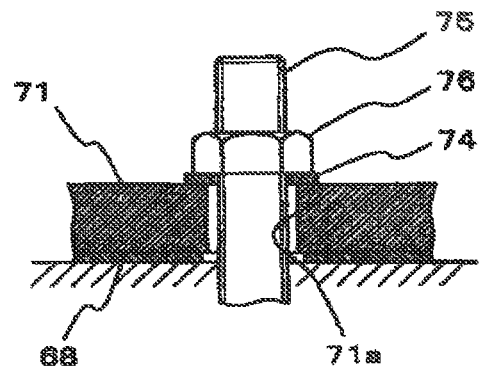
FIG. 15 is a sectional view of a foundation bolt portion in which a fixing portion of the enclosed switchboard according to Embodiment 4 is fixed to a foundation.

FIG. 15 is a sectional view in the case of fixing to the foundation using a foundation bolt 73 from the upper side of the reinforcing member 71. An embedded metal (not shown in the drawing) having a female screw to be adapted to a male screw of the foundation bolt 73 is embedded in the foundation surface side. As shown in the drawing, fixing is made by clamping the foundation bolt 73 via a flat washer 74.

Figure 16:
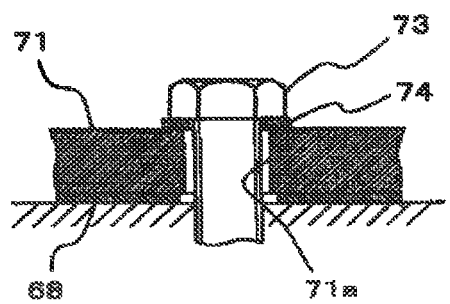
FIG. 16 is a sectional view showing other example of the foundation bolt portion.
Figure 17:
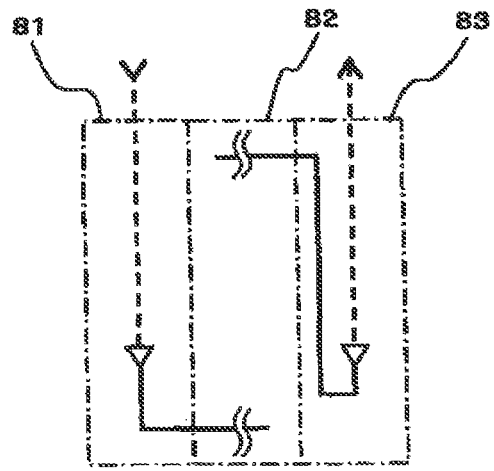
FIG. 17 is a single line diagram for explaining the configuration of cable lead-in and lead-out portions of a conventional switchboard.
Figure 18:
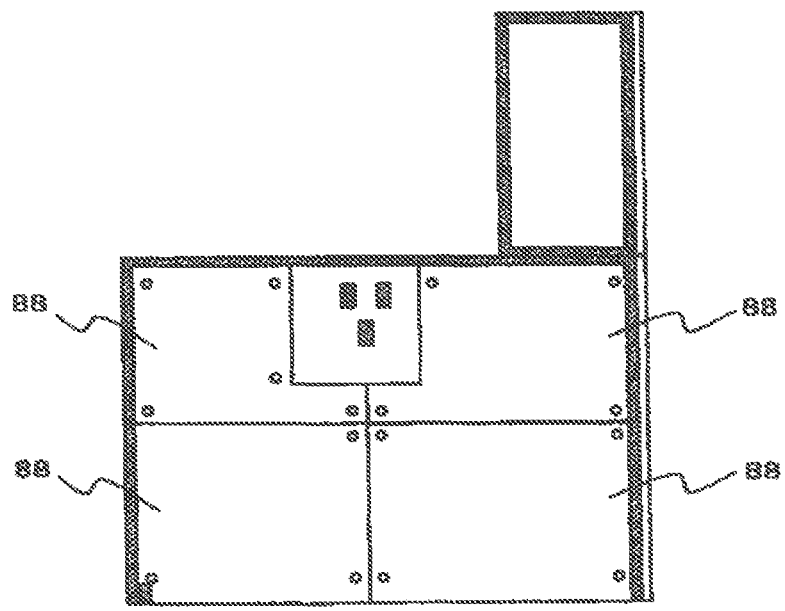
FIG. 18 is a side sectional view showing an example showing a conventional technique provided with a fire-retardant plate.
Figure 19:
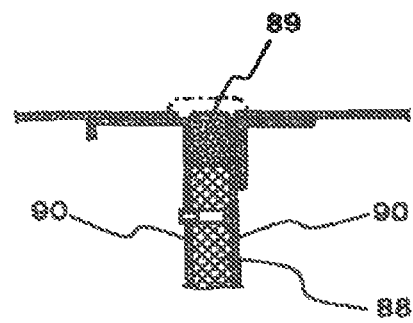
FIG. 19 is a partial sectional view in which the structure between circuit breaker boards of FIG. 18 is shown in detail.
Figure 20A:
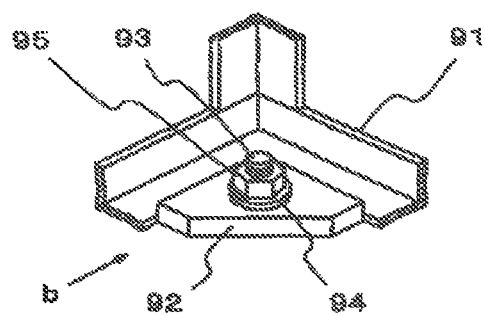
FIG. 20A is a perspective view and FIG. 20B is aside sectional view, each showing a fixing device of the conventional switchboard.
Figure 20B:
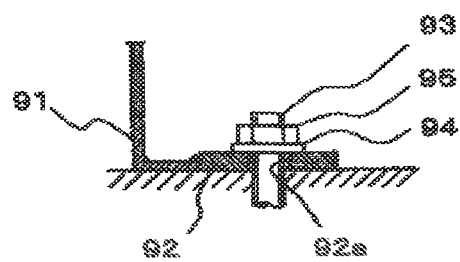

FIG. 16 is the case where an anchor bolt 75 is preliminarily embedded at a predetermined position of the foundation surface. The housing 61 is installed to the foundation surface in accordance with the anchor bolt 75, a nut 76 is clamped via the flat washer 74, and the housing 61 is fixed by fixing the reinforcing member 71 to the foundation surface.

Next, the action of the reinforcing member 71 will be described.

As described above, the reinforcing member 71 is made of a thick plate that is thicker than the thickness of the surrounding frames fixed thereto, and is provided over the whole width directional length of the housing 61. Therefore, rigidity of a floor of the enclosed switchboard can be enhanced; and even if such a large force as to shake the housing 61 by an earthquake or the like is exerted, a fixing portion of the floor of the housing 61 can be prevented from being deformed.

Furthermore, the reinforcing member 71 is provided over the whole width directional length of the housing 61 and the holes for foundation 71a are formed near the length directional both end portions of the reinforcing member 71. Therefore, a pair of the holes for foundation 71a are formed on the same member; and thus, for example, as compared to the case where the individual reinforcing member is welded on the left and the right of the housing as disclosed in Patent Document 4, a dimension between the pair of the holes for foundation 71a can be processed with high accuracy at a manufacturing stage of the reinforcing member 71. For this reason, the dimension between the bolts does not need to be adjusted later; and therefore, welding work and site installation work of the housing 61 become easy. Furthermore, the number of components can also be reduced.

Further, dimensional accuracy between the holes of the pair of the holes for foundation 71a formed in the reinforcing member 71 is enhanced as compared to the individual case; and thus, the hole diameter of the hole for foundation 71a does not need to be a large hole in anticipation of a dimensional error and the hole can be, for example, a standard bolt hole specified by standards. By this, a large diameter and thick special washer does not need to be used at a bolt clamping portion; and even when a standard flat washer of a generally used standardized article is used, it becomes possible to maintain high rigidity of the bolt clamping portion.

Incidentally, dimensions of the holes for foundation 71a formed in the respective reinforcing members 71 of the front side and the back side (or the intermediate portion) are severe to enhance dimensional accuracy because of different members as compared to the left and right holes for foundation 71a; however, even in this case, as compared to the case of individual four corners like Patent Document 4, dimensional accuracy is easier to enhance. Furthermore, the hole for foundation 71a is not a round hole, but may be a long hole that is long in the front-back direction.

As described above, according to the enclosed switchboard of Embodiment 4, the enclosed switchboard includes the housing whose outline is formed in the substantially cuboid shape by combining the vertical frames, the width directional frames, and the depth directional frames. In the enclosed switchboard, the housing includes: a pair of vertical frames arranged in face-to-face relation on the left and the right in the width direction of the housing; the floor side width directional frame provided so as to connect the lower sides of the vertical frames; and the reinforcing member for fixing the housing. The reinforcing member is made of a plate thicker than the thickness of each of the frames and has a length whose both ends come into contact with the pair of the vertical frames, and the reinforcing member is arranged on the floor plate of the housing and fixed to the lower side of the pair of the vertical frames and the floor side width directional frame by welding. Consequently, rigidity of the floor of the enclosed switchboard can be enhanced and the enclosed switchboard excellent in seismic adequacy can be provided.

Moreover, the reinforcing member is provided on the front side, the back side, and the intermediate portion in the depth direction of the housing, whereby, in addition to rigidity of the front and the back of the housing, rigidity of the floor at the intermediate portion to which many loads of the devices to be contained in the switchboard are applied, is enhanced and therefore the enclosed switchboard excellent in seismic adequacy can be obtained.

Furthermore, the hole for foundation, which is for fixing the reinforcing member to the foundation surface, is provided near length directional both end portions of the reinforcing member, whereby a dimension between the holes for foundation in the left-right direction of the housing can be formed with high accuracy and therefore welding work and site installation work of the housing become easy.

Further, the size of the hole for foundation is that of the bolt hole of standards corresponding to the foundation bolt to be used, whereby a special washer does not need to be used at the bolt clamping portion and a standard flat washer of a standardized article can be used.

Incidentally, in the present invention, the respective embodiments can be freely combined and appropriately changed or omitted within the scope of the present invention.

EXPLANATIONS OF LETTERS OR NUMERALS

1 Cable connection board
2 Device containing board (Circuit breaker containing board)
3 Housing
3a Lead-in port
3b Lead-out port
4 Cable lead-in compartment
5 Cable lead-out compartment
6 Partition plate
7 Lead-in side cable
8 Support member
9 Lead-in side main busbar
10 Supporting insulator
11, 14 Connection conductor
12 Lead-out side cable
13 Lead-out side main busbar
15a Lower circuit breaker compartment
15b Upper circuit breaker compartment
16 Controller compartment
17 Lead-out side main busbar compartment
18 Lead-in side main busbar compartment
19 Branch busbar
20a, 20b Opening portion
21a, 21b Working cover
31 Housing
32 Circuit breaker compartment 33 Busbar compartment
34 Back compartment
34a Upper stage cable compartment
34b Lower stage cable compartment
35 Second air heat insulation layer
35a Ceiling plate
36 Third air heat insulation layer
36a Partition plate
37 Fifth air heat insulation layer
37a Back plate
38 Fourth air heat insulation layer
38a Partition plate
39 First air heat insulation layer
39a Partition plate between boards
40 Circuit breaker
41 Busbar
42 Outside line cables for main circuit
43 Circuit breaker arc extinction chamber
44 Floor plate for fixing circuit breaker
45 Cover clamped with bolts
46 First metallic barrier
47 Second metallic barrier (47a, 47b)
48 Third metallic barrier (48a, 48b)
51 Circuit breaker secondary junction
52 Porcelain bushing
53 Circuit breaker faceplate
54 Front door
55 Upper limit of water-level capable of using upper stage side circuit in case of water intrusion into circuit breaker board
56 Control instrument
A Air heat insulation layer
B Metallic barrier
S1 Upper space
S2 Back space
U Circuit breaker board
61 Housing
62, 63, 69 Vertical frame
64, 65 Width directional frame
66 Depth directional frame
67 Reinforcement plate
68 Floor plate
68a Through hole
70 Floor width directional frame
71 Reinforcing member
71a Hole for foundation
71b Cutout portion
72 Welding portion
73 Foundation bolt
74 Flat washer
75 Anchor bolt
76 Nut
100 Cable connection board
200 Circuit breaker containing board
300, 400 Feeder board

The invention claimed is:

1. An enclosed switchboard comprising a housing whose outline is formed in a substantially cuboid shape by combining vertical frames, width directional frames, and depth directional frames, wherein said housing includes:

a pair of said vertical frames arranged in face-to-face relation on a left side and a right side in a width direction of said housing;

a floor side width directional frame provided so as to connect lower sides of said vertical frames, and including a top surface facing away from a floor plate, at least four side surfaces extending from the top surface, and an opposing bottom surface facing toward the floor plate and contacting the at least four side surfaces; and a reinforcing member for fixing said housing, said reinforcing member being arranged on the floor plate of said housing, and including a top wall facing away from the floor plate, at least four side walls extending from the top wall, and an opposing bottom wall facing toward the floor plate and contacting the at least four side walls, and a thickness of the reinforcing member from the bottom wall to the top wall is thicker than a thickness of each of said frames and having a length whose both ends come into contact with the pair of said vertical frames, and said reinforcing member being fixed to the lower sides of the pair of said vertical frames and to at least one of the at least four side surfaces said floor side width directional frame by welding.

2. The enclosed switchboard according to claim 1, wherein said reinforcing member is provided on a front side, a back side, and an intermediate portion in a depth direction of said housing.

3. The enclosed switchboard according to claim 1, wherein a hole for foundation, which is for fixing said reinforcing member to a foundation surface, is provided near length directional end portions of said reinforcing member.

4. The enclosed switchboard according to claim 3, wherein a size of the hole for foundation is that of a bolt hole of standards corresponding to a foundation bolt to be used.

5. The enclosed switchboard according to claim 2, wherein a hole for foundation, which is for fixing said reinforcing member to a foundation surface, is provided near length directional end portions of said reinforcing member.

6. The enclosed switchboard according to claim 1, wherein the reinforcing member has a substantially rectangular shape in plan view, first and second corners of the reinforcing member have cut-out portions, and third and fourth corners of the reinforcing member are provided without a cut-out portion.

7. The enclosed switchboard according to claim 1, wherein the reinforcing member has a substantially cuboid shape, and a volume of the substantially cuboid shape is filled with material.

8. The enclosed switchboard according to claim 1, wherein the reinforcing member is rectangular in cross-section as viewed from the ends of the reinforcing member that come into contact with the pair of said vertical frames.

* * * * *